July 15, 1952 — A. W. WAY ET AL — 2,603,354
PROCESS AND APPARATUS FOR OBTAINING A THICKENED CONCENTRATE
Filed Oct. 24, 1945 — 4 Sheets-Sheet 1
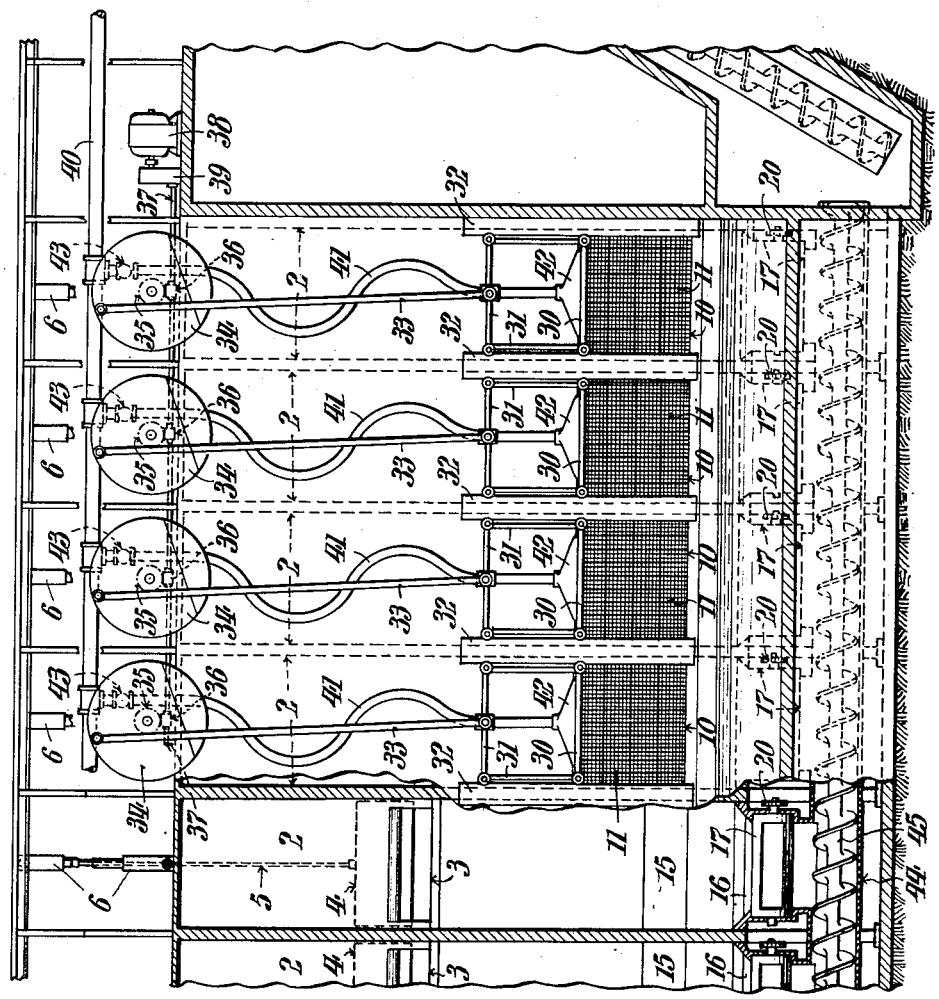
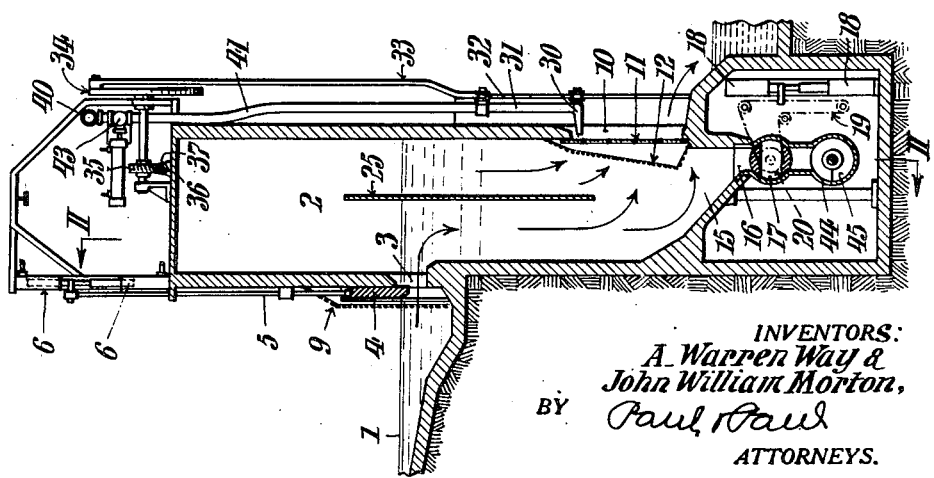
INVENTORS:
A. Warren Way &
John William Morton,
BY Paul & Paul
ATTORNEYS.

July 15, 1952     A. W. WAY ET AL     2,603,354
PROCESS AND APPARATUS FOR OBTAINING A THICKENED CONCENTRATE
Filed Oct. 24, 1945     4 Sheets-Sheet 2
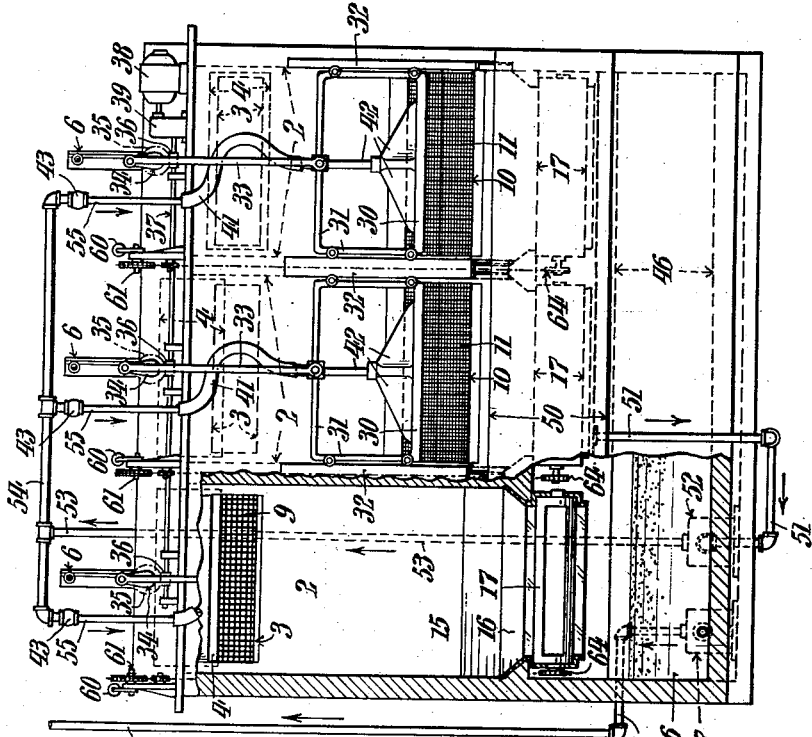
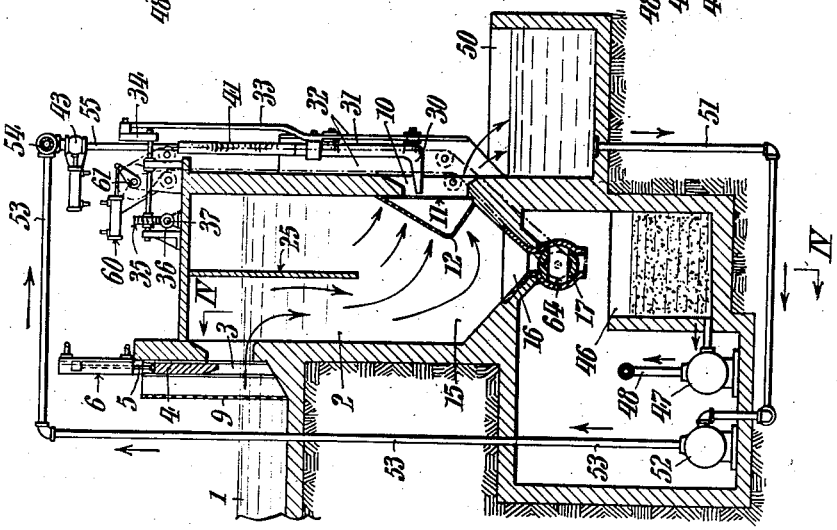
WITNESSES
Hubert Fuchs
Thomas W. Kerr, Jr.
INVENTORS:
A. Warren Way &
John William Morton,
BY Paul Paul
ATTORNEYS.

July 15, 1952 A. W. WAY ET AL 2,603,354
PROCESS AND APPARATUS FOR OBTAINING A THICKENED CONCENTRATE
Filed Oct. 24, 1945 4 Sheets-Sheet 3
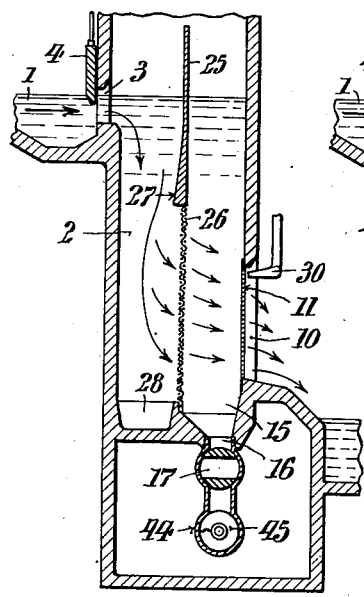
FIG_5_
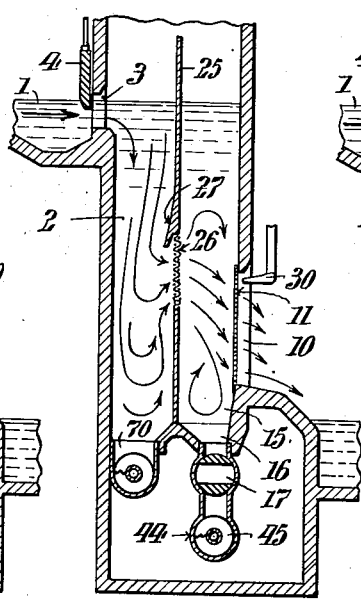
FIG_6_
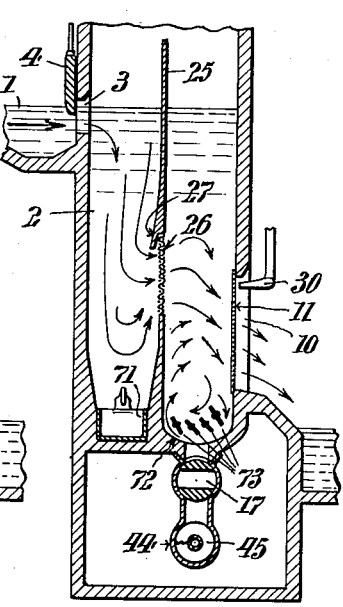
FIG_7_
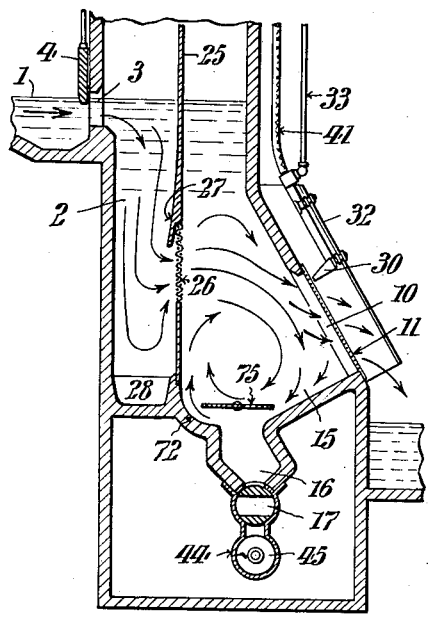
FIG_8_
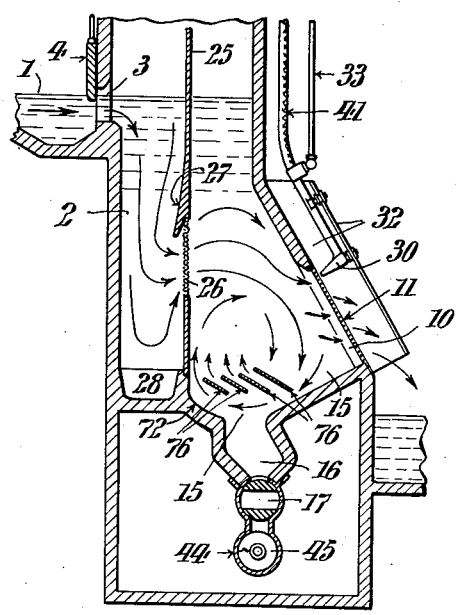
FIG_9_
WITNESSES
Hubert Fuchs
Thomas W. Kerr, Jr.
INVENTORS:
A. Warren Way &
John William Morton,
BY Paul & Paul
ATTORNEYS.

July 15, 1952 — A. W. WAY ET AL — 2,603,354
PROCESS AND APPARATUS FOR OBTAINING A THICKENED CONCENTRATE
Filed Oct. 24, 1945 — 4 Sheets-Sheet 4
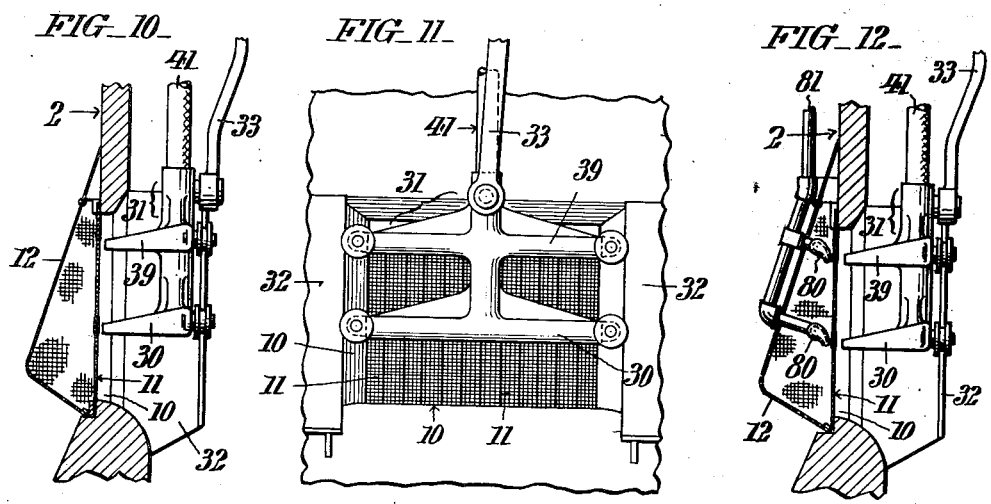
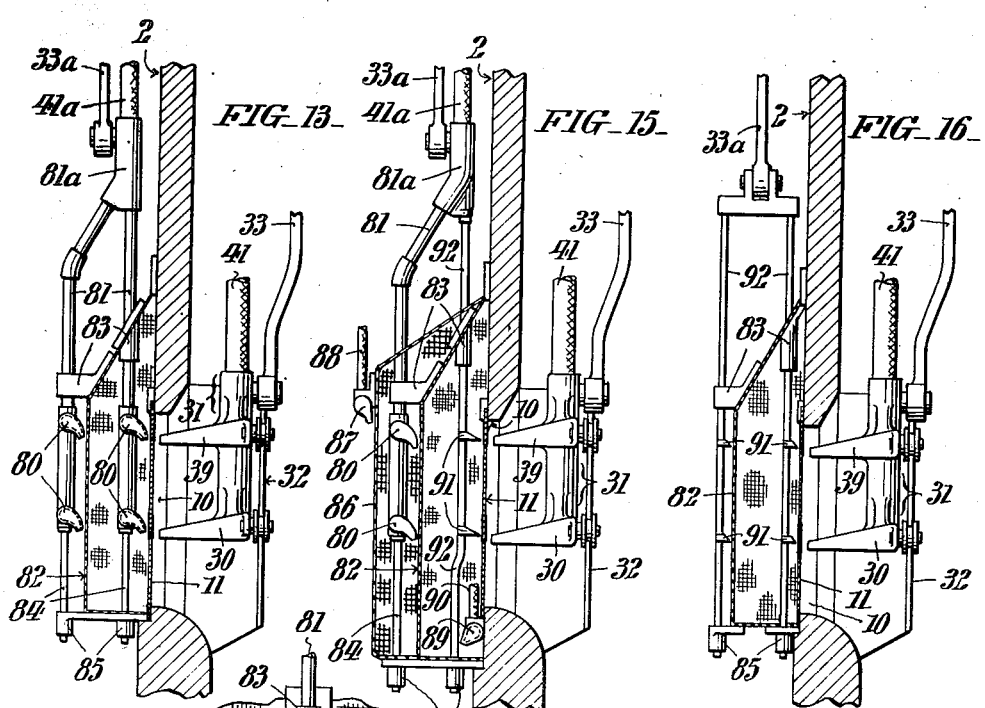
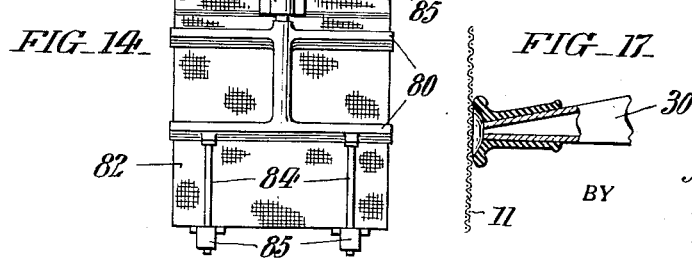
INVENTORS:
A. Warren Way &
John William Morton,
BY Paul Paul
ATTORNEYS.

Patented July 15, 1952

2,603,354

UNITED STATES PATENT OFFICE 2,603,354

PROCESS AND APPARATUS FOR OBTAINING A THICKENED CONCENTRATE

Alben Warren Way, Philadelphia, Pa., and John William Morton, Brooklyn, N. Y.; said Morton assignor to said Way Application October 24, 1945, Serial No. 624,144

11 Claims. (Cl. 210—43)

1

The usual processes for the removal of solid matter from flowing streams of water are filtration processes whereby, either with or without sedimentation, water is passed through a filtering medium in order to purify it. In these cases the object is to obtain a pure filtrate, that is to say, pure water, the solid matter removed being treated as waste.

Our present invention is a process by which not only is pure water obtained, but also a dense and valuable concentrate, usually semi-solid, but sometimes containing enough water to be capable of being pumped, and which is transported from the place where it is produced and stored or processed so that its useful component is separated from useless material and thus reclaimed.

The particular use to which we have applied our process is in the reclamation of particles of coal which are constantly carried down from coal mining regions by streams there arising. This waste at present merely clogs up the streams. But it contains a large proportion of finely divided coal which when separated from the silt or mud with which it is associated is a valuable fuel. This coal we reclaim.

Before the useful fine particles carried by a flowing stream can be separated from the useless particles, there must first be effected a condensation or "thickening" of the total particles and for ordinary purposes the proper degree of thickening is definitely ascertainable. Our process, therefore, differs from ordinary filtration processes in that it is not so much concerned with the filtrate as it is with the production of a sufficiently condensed concentrate; that is to say, with a thickened mixture of the removed solid particles with only a small amount of water. The screening operation by which we accomplish this and which we will now describe is capable of producing the proper degree of thickening or concentration, dependent upon the predetermined amount of solids carried by the stream in a given period as compared with the amount of water permitted to be associated with this amount, so as to best facilitate the removal of the concentrate and separation of the useful part in it from the useless part. The latter processes are known and we do not here describe them. The process herein described and claimed relates only to the process by which we thicken and remove from solids-laden water the solid matter accompanied by enough water to produce this concentrate in condition for subsequent processing to separate the useful from the useless part of the solids.

2

We will proceed to describe a mechanism or apparatus for carrying out this process without in any wise restricting our process to this particular apparatus.

Fig. 1 is a vertical cross-sectional view of a thickening chamber and accompanying parts suitable for the practice of our process.

Fig. 2 is an elevation of a series of such thickening chambers, partly in section as indicated by the arrows II—II in Fig. 1.

Fig. 3 is a vertical sectional view of a thickening chamber and accompanying parts similar in principle to that shown in Fig. 1, but showing certain variations for use when a more fluid concentrate is desired.

Fig. 4 is a cross-sectional view of the last named thickening chambers.

Figs. 5, 6, 7, 8 and 9 are vertical cross-sectional views of our thickening chambers, each figure showing certain useful variant features which may be applied thereto.

Figs. 10 and 11 are respectively cross-sectional and elevational views showing the use of a double nozzle to clean the screen.

Figs. 12 and 13 are cross-sectional views of the screen showing the double nozzle and also mechanism for cleansing the inner side of the screen or screens.

Fig. 14 is an elevational view of the cleansing mechanism of Fig. 13.

Figs. 15 and 16 are cross-sectional views showing the addition of scrapers on the inside of the screen or screens.

Fig. 17 is a detailed sectional view showing a rubber covering for the jet nozzle whereby the jet is made more powerful by concentration.

In the accompanying drawings, 1 is a stream of water carrying finely divided solid matter. It meets a thickening chamber 2 which receives it and allows it to flow from near its top toward the bottom of the chamber where it is discharged through a screen. This thickening chamber has an opening 3 for the entrance of the stream of water in the region of its upper end. This entrance is controlled by a gate 4, moved up and down by a rod 5, the reciprocation of which is accomplished by opposed pressure cylinders 6, 6 preferably controlled remotely from an operating station, whereby the gate of the entrance to the thickening chamber is maintained open or closed for the desired intervals. To prevent the entrance into the chamber of unduly large solids, a coarse screen 9 guards the inflow of the stream on the outside of the gate.

10 is the outlet of the thickening chamber, at or near its bottom. It forms a frame for a screen 11 which, as shown, is vertical, although inclination is permissible. This screen is very fine and is sectionalized by both horizontal and vertical supporting members so that notwithstanding its fineness it is capable of resisting the water and other pressure to which it is subjected. There is another coarse mesh protecting screen 12 on the inside of the settling chamber which prevents too large solids from being carried against the fine screen 11. The bottom of the chamber is contracted to form a sump 15 having an exit 16 along its bottom controlled by a valve 17, the opening and closing of which is accomplished by opposing pressure cylinders 18 of which the piston is attached to an endless chain 19, trained around idle sprockets and also around the sprocket 20 on the valve pivot. The pressure cylinders are preferably subject to remote control.

A baffle plate 25 is mounted more or less centrally in the thickening chamber. It extends downwardly far enough to prevent direct impact of the incoming stream against the fine screen 11 and to cause the flow to take a generally horizontal direction as it approaches the screened outlet.

On the outside of the screened outlet is a nozzle 30 having a long narrow outlet slot extending across the width of the fine screen and capable of projecting a jet of water under considerable pressure against the screen from the outside, the purpose of which jet is to keep the inner surface and meshes of the screen clean by forcing from it any accumulation of solid matter clogging it. The nozzle 30 is fixed on a framelike structure 31 guided for up and down movement by guides 32 on the rear wall of the chamber and reciprocated by a crank disc 34 with which the frame is connected by a rod 33. The shaft of the crank disc 34 has a worm wheel 35 driven by a worm 36 on a shaft 37 running along the platform, with identical arrangement for moving the crank discs of other similar thickening chambers. The shaft 37 is operated by a motor 38 and reduction gearing 39.

The nozzle 30 is supplied by a water line 40 from which proceed branches, each with a flexible or extensible component 41 and a spreading end 42. The nozzles may be shut off by remote control (not shown) or by hand valves 43.

Below the valve which controls the bottom outlet 16 is an elongated conduit 44 within which operates a screw conveyor 45 which by continual rotation carries with it to a desired point of discharge all the concentrate produced in and removed from the thickening chamber.

We have described a single thickening chamber, but they are usually arranged in series. In Fig. 2 may be seen a series of six such chambers placed in juxtaposition to each other, having their inlets and outlets at a common level, and arranged so that the control of their inlet gates, the control of their bottom valve outlets, and control of the jets for their screened outlets is accomplished in proper sequence by suitable mechanism. The jet of water from the nozzle 30 whereby the outlet screen is maintained in proper condition for its work is reciprocated vertically according to a timed schedule which is the same for all of the six chambers in the series to which we have made reference.

The operation of our process is as follows: Solids-laden water is constantly admitted through the intake to, for example, five of these thickening chambers, the sixth being excepted because its gate is at this time closed. Under these circumstances each one of these thickening chambers contains water carrying finely divided solid matter flowing down into it and going to the bottom until the water level is above that of the screen 11 and thereafter flowing out of it through the outlet screen 11 for, say, 25 minutes; but thereafter by closure of the entrance gate no further water is admitted for a time, say, five minutes. The size of the intake and the outlet and the fineness of the screen are so related as to create a head of water in the thickening chamber causing a constant flow through the screen under the pressure of this head. The pressure of the water jet from the nozzle 30 is much greater than the pressure under which water escapes through the screen 11, and this enables the jet as it moves constantly up and down over the screen to clear its apertures of any clogging material. The screen 11 thus checks the solids within the chamber, preventing them from passing out but allows free passage of clear water. Consequently the solids-content of the chamber continually increases (this is the "thickening" process) until the ratio of solids to water in the chamber has substantially reached a predetermined figure. This time interval is determined by the percentage of solids in the streams and the rate of flow through the screen, and having been determined the operation is correspondingly controlled. At the end of the interval the flow of back-wash from the water jet is stopped, the intake gate is closed, and the level of the water within the thickening chamber falls as it runs through the screen until the level is below the lower edge of the screen. What is left in the sump 15 consists of solids with some liquid thickened or condensed to the desired ratio of solids to water. This residue in usable form is now drawn off by opening the valve at the bottom, permitting all of the concentrate to flow down through the valve into the circular chamber below, from which it is carried away by the screw conveyor to the place of reclamation of the desirable portion of the solids. The percentage of solids to liquid in this thickened residue is in the ratio of the total solids accumulated by the thickening process to the amount of water in the sump, which in turn depends upon the cubic capacity of the sump measured from the bottom of the screen down to its lowest point.

When the thickened residue has been drawn off the valve is closed, and the entrance gate opened for the required length of time, the flow of the water jet from the nozzle 30 also recommences with production of a similar concentrate, and thus the process repeats itself. By properly proportioning the periods during which each gate is closed or open and arranging for the proper sequence of this as between the several thickening chambers in the series, a continuous operation of our process is secured with no interruption by reason of the temporary intermission of the outflow in any single settling chamber.

To best secure this continuous sequence of operations remote control of the operations, preferably by air pressure, at a suitably located operating station is desirable. In the installation shown this is directly over the series of chambers. Manual operation of this control is possible but not convenient.

The total amount of solid particles carried by the stream having been found, the timing of the gates and valves is calculated and adjusted so as to yield a concentrate of the volume and consistency desired. The removal of the desired concentrate from the several thickening chambers proceeds indefinitely. Usually it is found that the proportion of solids to liquid contained in the inflowing stream is sufficiently constant to permit a constant timing of the gates and valves in order to yield a concentrate of the volume and consistency desired; but if the proportions of solid to liquid varies in the stream from time to time, ascertainment of this variation is made and the timing altered to correspond, and this variation may if desired be accomplished automatically so that there always is produced a concentrate which has been thickened to the desired extent.

We have thus far described a typical apparatus useful for the practice of our process, and have described the general nature and operation of the thickening process which may be carried on in such an apparatus; but as the proportion of solids to water in one or another inflowing stream varies, and also the size, nature and specific gravity of the particles, variant methods of operation and differing apparatus become necessary to meet these varying conditions. We will now describe certain modified forms of apparatus to be used according as they may be required to take care of such variations.

Under certain circumstances, as for example, where the solids-laden stream contains only very fine particles, it sometimes becomes desirable that the thickening process be not carried far enough to produce a semi-solid capable of mechanical transportation but be kept more liquid and of a consistency capable of being pumped. For this purpose, in Figs. 3 and 4 an apparatus is shown in which the sump is larger and the discharge through the valve 17 is into a tank 46 from which the concentrate is removed by a pump 47 discharging through an outflow pipe 48. In this apparatus clear water which passes as a jet through the nozzle 30 and plays against the outside of the screen, is obtained from the outgoing clear water which has passed through the screen. This is accomplished by the formation of a large trough 50 below the outgo side of the screen from which sufficient clear water for this purpose is drawn by pipe line 51 to pump 52 which forces it through pipe line 53 to header 54 from which it is distributed by pipes 55 to the nozzles which are used in connection with each of thickening chambers shown in Fig. 4. The effectiveness of the jet may be thus increased. In this apparatus (shown in Figs. 3 and 4) the operation of the valve 17 is effected not from pressure cylinders in the space below the settling chambers, as in the apparatus shown in Figs. 1 and 2, but by means of a pressure cylinder 60 located at the operating station. The piston of this cylinder operates a crank on a shaft 61 carrying a sprocket around which is trained a sprocket chain which under guidance of idlers is led down and around the pulley 64 on the shaft of the valve 17.

Fig. 5 illustrates by a vertical section a variation in the construction of the thickening chamber especially useful where the inflowing solids-laden stream carries with it a considerable quantity of larger solids which are capable of removal by gravity. Accordingly in this form the baffle plate 25 which stretches across the thickening chamber from side to side is prolonged downward toward the bottom of the chamber, the lower portion constituting a coarse screen 26 of, say, about ¼ inch mesh. There is a deflecting projection 27 at the lower end of the solid portion of the plate which protects the screen below it against the impact of too large or too solid pieces directly hitting the screen; and at or near the bottom of this screen and on the intake side is a collecting trough 28 from which particles falling in front of the screen are from time to time removed. It will be noticed that in this form the coarse screen is directly in front of the fine screen and the stream of water flowing through the thickening chamber passes almost horizontally from one screen to another, although the head of water is about the same on both sides of the baffle plate.

In a variant construction shown in Fig. 6 most of the parts are similar to those shown in Fig. 5, but the coarse screen instead of being at the bottom of the baffle plate is more near to its middle and somewhat above the level of the fine screen. Thus part of the water flowing through the coarse screen passes across to a point opposite to or above the top of the latter screen causing a downward flow across the face of said screen as well as through it, giving a showering or cleaning action over the intake face of the screen. This further tends to carry retained solid matter toward the bottom of the thickening chamber. This downward flow, however, is not a free flow because the chamber is completely filled but is a current passing downward to the pocket or reservoir at the bottom of the thickening chamber. This facilitates the deposition of solid matter at the bottom of the thickening chamber. At the bottom of the entrance side of the thickening chamber a trough 70 containing a screw conveyor receives and removes all solid matter which falls therein after being held back by the protecting screen 26.

In the variant construction shown in Fig. 7 the removal of this falling material or coarse sediment is otherwise effected from a bottom trough 71 and the bottom of the other part of the thickening chamber is made with a rounded contour 72 and fitted with a series of vanes 73 near the bottom to take advantage of the circular motion of the water created by the downward flow across the face of the fine screen and down to the rounded bottom. These vanes are adjustable and are so adjusted, especially the one which the flow first meets, that the portion of the flow nearest the face and therefore most heavily laden with solid matter passes below its lowest edge, with production of settlement at the bottom of the chamber. This vane as well as the others, acts to hold the solids-laden water or to retard its return, allowing the water to flow away as the solid matter goes to the bottom.

In Fig. 8 a construction is shown in which the fine screen 11 is inclined in a manner to give certain advantages. It permits the use of greater screening surface and allows for a still greater circular flow of the currents on its intake side, for due to the inclination of the screen much of the solid matter automatically falls away toward the bottom of the chamber and is gently pushed under the edge of a cross plate 75, the position of which may be made to correspond to the amount of the current which it is desired shall flow beneath it. The plate thus materially assists in the separation of the solid matter from the water which is circulating just above it. In Fig. 9 the same construction is shown but in place of the plate 75 are substituted a number of cross vanes 76 in an inclined position which likewise assist the separation of solid matter from the water circulating above it.

In all the forms of apparatus thus far described the water pressure which causes the screening operation to proceed constantly and effectively is due to a head of water maintained in or over the thickening chamber, but substantially the same process may be carried on if solids-laden water or other fluid is fed under pressure, as by pumping, to the thickening chamber although for this purpose somewhat variant apparatus is called for.

Figs. 10 and 11 are respectively sectional and elevational views of a modified form of means by which back wash is accomplished. Where the proportion of very fine solids carried by the stream of water is high there is a greater tendency for the solids to clog and check the action of the fine screen. To prevent this it becomes desirable to increase the efficiency of the back wash by fitting the structure 31 with a second nozzle 39 producing a second horizontally extended jet a short distance above the other nozzle 30. These are so spaced that with the same constant reciprocation of the frame each half of the screen receives twice as much back wash as would otherwise be the case. If necessary more of these nozzles than the two shown may be provided.

Fig. 12 is a vertical sectional view of a variant construction in which in addition to the duplicate jet nozzles on the outside of the screen two stationary nozzles 80, 80 discharge streams of water downwardly over the intake side of the screen. These nozzles 80 are connected with a water pipe 81 which supplies the water whereby these nozzles project the jets down and across the screen, thus supplementing the jets on the outgo side of the screen in keeping the screen free from clogging.

In Fig. 13 is shown in vertical section a variant apparatus in which the action of the screen 11 is supplemented by the action of a coarser screen 82 parallel with it but situated on its intake side so that a part of the screening action is effected by this second screen. Both of these screens are associated with vertically reciprocating nozzles 80, 80 on the intake side by which the cleansing of the screens is assisted by downward jets of water supplied to these nozzles by water pipes 81, as they move up and down the intake side of the screens.

The water pipe 81 is held for vertical reciprocation in a guideway 83 and is connected with a water supply line 41a, the union-fixture 81a having a pivotal connection with the reciprocating rod 33a which may be given vertical movement by a crank on the shaft 37. There are aligned guide rods 84 fixed on the lower nozzles 80, moving in guideways 85 below the bottom of the screen 82. The nozzles 80 move in unison with nozzles 30 on the outside of the screen 11 so that any solids liberated from the screen by action of nozzles 30 are immediately caught and carried off by the downward action of nozzles 80.

Fig. 14 is an elevation of the double reciprocating nozzles 80 as seen from the left in Fig. 13.

Fig. 15 shows how a series of screens of different meshes can be advantageously employed in combination with stationary as well as reciprocating jet-nozzles and scrapers. The added screen 86 is of coarser mesh than the screen 82 which in turn is of coarser mesh than the screen 11. It is washed by a stationary nozzle 87 on the inside of the screen and near its upper part. This nozozle 87 is supplied by a water line 88. Another stationary jet-nozzle 89 supplied by the water pipe 90 is located just inside and below the fine screen 11 in order to clean the bottom of the screening and also to help to transfer the fine silt downwardly into the region of accumulation 15. The nozzle arrangement here shown and its water supplying means and moving means is like that shown in Fig. 13, but the intake side of the screen 11 is kept free from clogging accumulation of solid matter by the use of horizontal scrapers 91 fixed on a vertically reciprocating rod or rods 92 guided at 83 and 85 and connected with the union-fixture which is pivotally connected to the rod 33a. The scrapers can be solid or semi-flexible or of rubber and move with a sliding fit along the inside of the screen 11. The system shown in Fig. 15 has advantages. It provides a compact unit capable of keeping the screens clean and free from damage while working at high capacity. By a series of screening actions the water containing only the finest particles reaches the finest screen 11 where the solids are stopped and rapidly forced down to the sump by the action of the scrapers.

Fig. 16 shows an arrangement similar to Fig. 13 but with scrapers working on both screens 82 and 11.

From the typical arrangements which have been shown it will be understood that any advantageous combination of screens and any number of screens, with stationary or moving washing jets and scrapers can be used to meet varying conditions.

Fig. 17 shows a fixture of rubber-like material put around the ejection slot of the nozzle 30. Its mouth is flared upward and downward and it reaches the screen with its rounded lips, having a sliding fit in its motion. The beneficial effect of its action lies in setting up a concentration area of jet force within its flare, penetrating the screens and forcing back any solids caught in their channels and so that they are liberated for accumulation inside the screen, while when plain nozzles are used the force of the jet is less concentrated and less effective.

Having thus described our invention, we claim:

1. The apparatus for deriving a concentrated mixture of solid and liquid material from a solids-carrying stream of water which comprises a thickening chamber, a gated entrance in the region of the top of said chamber for admission of the stream by natural flow, an outlet near its bottom having a screen of such fineness as to retain solid matter in the chamber, the size of the entrance to the chamber and the capacity of the outflow channels of the screen being proportioned so as to maintain a head of water above the outlet screen and a substantially constant flow through the screen so long as the entrance gate is open, with accumulation of solid matter behind the screen; an outlet conduit extending below the bottom of said screen in which the screened liquid escapes to a level below said screen, a sump at the bottom of the thickening chamber below the lower edge of the screened outlet, said sump and outlet conduit being at opposite sides of the screen, and a valved exit at the bottom of the sump through which the concentrate accumulating in the sump may be removed, said valved exit being free of connection with the entrance gate and constructed to open and close independently thereof.

2. Apparatus as defined in claim 1 including additionally a movable nozzle projecting a jet of water against the outflow side of the screen to prevent clogging of the screen, and another nozzle projecting another jet of water downwardly over the intake side of the screen whereby clogging matter driven back by the first mentioned jet is driven down by the second, and means for moving said movable nozzle in a plane adjacent said screen.

3. Apparatus as defined in claim 1 including additionally a movable nozzle projecting a jet of water against the outflow side of the screen to prevent clogging of the screen, and a reciprocating scraper operating against the intake side of the screen and removing from it clogging matter driven back by the action of the jet from the movable nozzle, and reciprocating means for moving said jet and scraper in planes adjacent said screen.

4. Apparatus as defined in claim 1 in which the gated entrance and screened outlet are disposed on opposite sides of the thickening chamber and a baffle plate is mounted crosswise of the thickening chamber, with a portion thereof opposite the entrance whereby the entering stream of water is deflected downwardly and compelled to pass into the sump before passing through the screened outlet.

5. Apparatus as defined in claim 1 including additionally an elongated nozzle directed against the outlet side of the screen, means for reciprocating the nozzle, and means for supplying water to said nozzle under pressure greater than that of the stream of water passing through the screen, whereby an elongated jet of water passes through the screen in a direction opposed to that of the stream and removes solid matter accumulating on the intake surface of the screen.

6. Apparatus as defined in claim 1 including additionally a nozzle movable over the outflow side of said screen and delivering a jet of water thereagainst for the removal of clogging matter, and a flexible covering for the nozzle with lips pressing against the screen whereby the jet of water passing through the nozzle is delivered against the screen in an area restricted by the position of the lips of the covering.

7. The apparatus for deriving a concentrated mixture of solid and liquid material from a solids-carrying stream of water which comprises a thickening chamber, a gated entrance in the region of the top of the chamber for admission of the stream by natural flow, an outlet near its bottom having a screen of such fineness as to retain solid matter in the chamber, a sump at the bottom of the thickening chamber below the screened outlet, the top of the sump and the bottom of the screen being at a substantially common level, the size of the entrance to the chamber and the capacity of the outflow channels downstream of the screen being proportioned so as to maintain a head of water above the outlet screen and a substantially constant flow through the screen so long as the entrance gate is open, with accumulation of solid matter upstream of the screen, said outlet extending below the bottom of said screen in which the screened liquid escapes to a level below the top of said sump, a valved exit at the bottom of the sump through which concentrate accumulating therein may be removed, said valved exit being free of connection with the gated entrance and constructed to open and close independently thereof; and means for opening and closing the gated entrance and the valved exit in a given sequence whereby the proportion of solids to liquids in the concentrate as removed may be regulated.

8. The apparatus for deriving a concentrated mixture of solid and liquid material from a solids-carrying stream of water which comprises a thickening chamber, a gated entrance in the region of the top of said chamber, an outlet near its bottom having a screen of such fineness as to retain solid matter in the chamber, the size of the entrance to the chamber and the capacity of the outflow channels of the screen being proportioned so as to maintain a head of water above the outlet screen and a substantially constant flow through the screen so long as the entrance gate is open, with accumulation of solid matter behind the screen; a sump at the bottom of the thickening chamber below the lower edge of the screened outlet; a valved exit at the bottom of the sump through which matter accumulating in the reservoir may be removed; said valved exit being free of connection with the gated entrance and constructed to open and close independently thereof, a vertically movable jet projecting water against the screened outlet in opposition to the fluid outflow and capable of timed movement to regularly subject all parts of the screen to the action of the jet and reciprocating means for moving said jet vertically adjacent said screen.

9. The process of obtaining a thickened concentrate of finely divided suspended solids and water from a natural stream of water which consists in subjecting the flowing stream to a screening process, with detention of finely divided solid matter on the up-stream side of the screen, causing the screened liquid to flow to a point below the bottom of said screen, continuing such screening process for the length of time required to produce a thickened concentrate having a definite predetermined ratio of solids to liquid, excluding the natural stream from said thickened concentrate, thus isolating a thickened concentrate batch, then drawing off the thickened concentrate batch, and repeating the process.

10. The apparatus for deriving a concentrated mixture of solid and liquid material from a solids-carrying stream of water which comprises a thickening chamber, said chamber having a gated entrance, said chamber having an outlet near its bottom and a screen of such fineness as to permit liquid outflow and retain solid matter in the chamber, the size of the entrance to the chamber and the capacity of the outflow channels of the screen being proportioned so as to maintain a head of water above the outlet screen and a substantially constant flow through the screen so long as the entrance gate is open, with accumulation of solid matter behind the screen; a sump at the bottom of the thickening chamber below the lower edge of the screened outlet; a valved exit at the bottom of the sump through which matter accumulating in the reservoir may be removed; and means in the form of a conduit for carrying the liquid outflow to a point below the bottom of said screen and thereby preventing the liquid outflow from backwashing while said concentrate is discharged, said valved exit being free of connection with the gated entrance and constructed to open and close independently thereof.

11. Apparatus for deriving a concentrated mixture of solid and liquid material from a solids-carrying stream of water which comprises a thickening chamber, a sump at the base of said thickening chamber, said chamber having a gated entrance intermediate the top and bottom of said chamber, said chamber having an outlet intermediate the top and bottom of the chamber and wholly below the level of said entrance, a screen for said outlet having a bottom edge at the top of said sump, a portion of said screen being above the sump, and said screen also having a top edge below the level of said entrance, said screen being of such fineness as to retain solid matter in the chamber, the size of the entrance to the chamber and the capacity of the outflow channels of the screen being proportioned so as to maintain a head of water above the outlet screen and a substantially constant flow through the screen so long as the entrance gate is open, with accumulation of solid matter behind the screen; an outlet conduit extending below the bottom of said screen in which the screened liquid escapes to a level below said screen, a sump at the bottom of the thickening chamber below the lower edge of the screened outlet, said sump and outlet conduit being at opposite sides of the screen, and a valved exit at the bottom of the sump through which the concentrate accumulating in the sump may be removed, said valved exit being free of connection with the entrance gate and constructed to open and close independently thereof.

ALBEN WARREN WAY.
JOHN WILLIAM MORTON.

REFERENCES CITED

The following references are of record in the file of this patent:

UNITED STATES PATENTS

| Number | Name | Date |
| --- | --- | --- |
| 594,847 | Bennett et al. | Dec. 7, 1897 |
| 748,821 | Wackerow | Jan. 5, 1904 |
| 870,631 | Kneuper | Nov. 12, 1907 |
| 872,033 | Waite | Nov. 26, 1907 |
| 895,083 | Gardiner | Aug. 4, 1908 |
| 952,620 | Keyes | Mar. 22, 1910 |
| 1,124,774 | Marsh | Jan. 12, 1915 |
| 1,152,399 | Cronenberger | Sept. 7, 1915 |
| 1,307,686 | Linden | June 24, 1919 |
| 1,357,499 | Hunt | Nov. 2, 1920 |
| 1,416,538 | Wichman | May 16, 1922 |
| 1,430,638 | Giesler | Oct. 3, 1922 |
| 1,547,955 | Price | July 28, 1925 |
| 1,585,717 | Bailey et al. | May 25, 1926 |
| 1,591,821 | Heaton | July 6, 1926 |
| 1,605,022 | Hapgood | Nov. 2, 1926 |
| 1,661,284 | Fuqua et al. | Mar. 6, 1928 |
| 1,665,164 | Gard et al. | Apr. 3, 1928 |
| 1,768,314 | Folta | June 24, 1930 |
| 1,866,519 | Rataiczak | July 5, 1932 |
| 2,090,637 | Paige | Aug. 24, 1937 |
| 2,169,442 | Wuensch | Aug. 15, 1939 |
| 2,286,432 | Monsarrat | June 16, 1942 |

FOREIGN PATENTS

| Number | Country | Date |
| --- | --- | --- |
| 435,852 | Great Britain | Dec. 22, 1933 |